Dec. 20, 1960
A. E. GARNER
2,965,430
CAKE SERVER
Filed Jan. 22, 1960
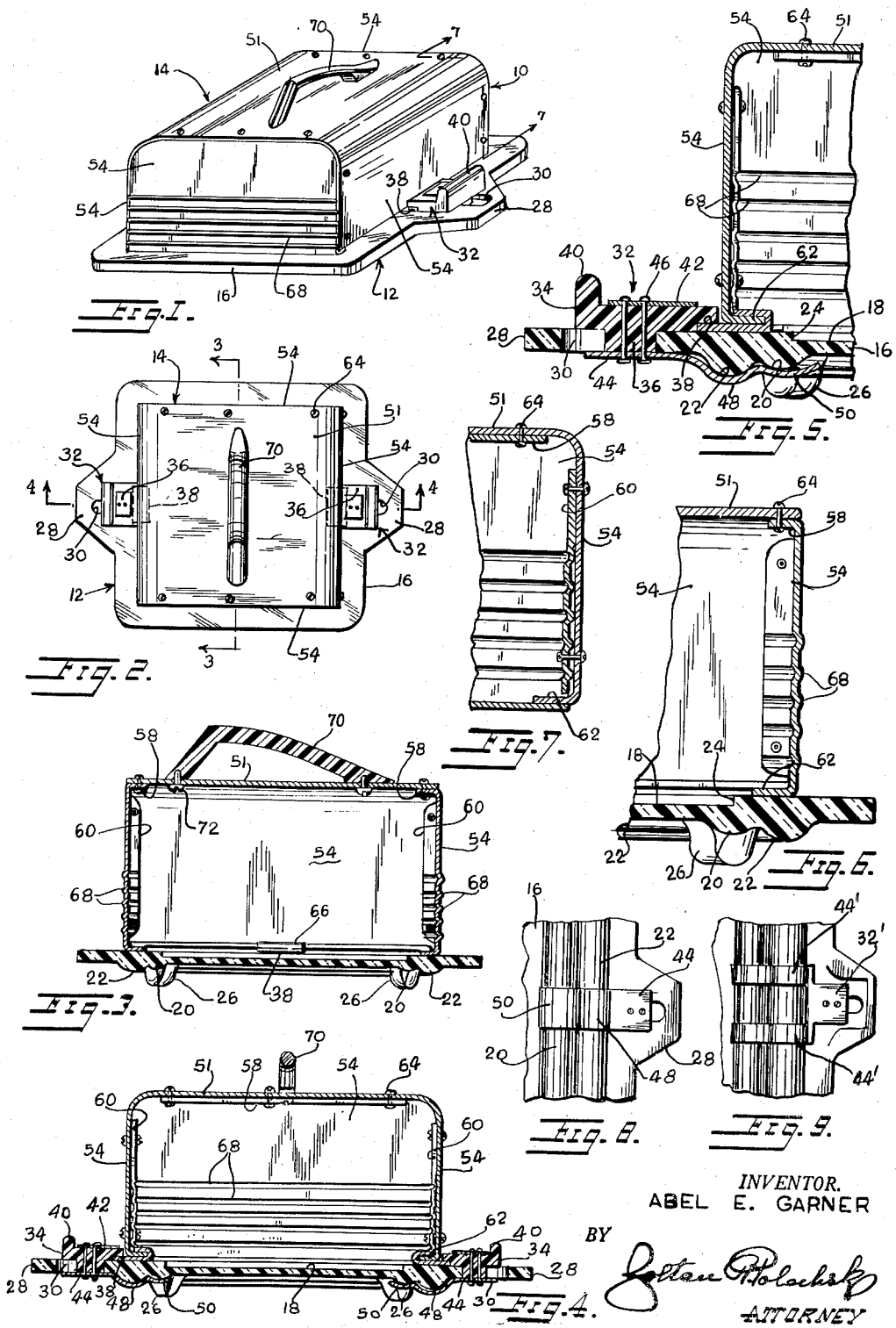
INVENTOR.
ABEL E. GARNER
BY
ATTORNEY

United States Patent Office 2,965,430
Patented Dec. 20, 1960

2,965,430

CAKE SERVER

Abel E. Garner, 480 Park Ave., New York, N.Y.

Filed Jan. 22, 1960, Ser. No. 4,117

3 Claims. (Cl. 312—284)

This invention relates generally to a cake server and more particularly to a combined cake holder and cover therefor.

A principal object of the present invention is to provide a cake holder and a cover for a cake holder that keeps the cake fresh, that permits ready access to the cake and wherein the cover is easily put over and removed from the cake.

Another object is to provide a combined cake holder and cover that is simple in construction, sanitary, attractive in appearance and that can be manufactured and sold at a reasonable cost.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is a perspective view of a cake holder and cover embodying one form of my invention.

Fig. 2 is a top plan view thereof.

Fig. 3 is a sectional view taken on the line 3—3 of Fig. 2.

Fig. 4 is a sectional view taken on the line 4—4 of Fig. 2.

Fig. 5 is a fragmentary vertical sectional view taken on a line across the center of the cake holder and cover, on an enlarged scale.

Fig. 6 is a fragmentary vertical sectional view taken through the longitudinal center of the cake holder and cover, on an enlarged scale.

Fig. 7 is an enlarged sectional view taken on the line 7—7 of Fig. 1.

Fig. 8 is an enlarged top plan detail view of the latch for the cover shown in Fig. 1.

Fig. 9 is a similar view of a modified form of latch.

Referring in detail to the drawings, in Fig. 1 a cake holder and cover therefor embodying my invention is shown and is indicated generally by the numeral 10. The cake holder and cover comprises a cake holder or support 12 and a removable cover 14 therefor.

The cake holder 12 is formed of glass or other suitable material and comprises a substantially square-shaped flat plate-like body constituting a tray structure 16. The top surface of the plate-like body is smooth and flat and at its center is formed with a countersunk portion 18. On the bottom surface a pair of closely spaced elongated inner and outer beadlike projections 20 and 22 are formed extending around the four sides of the body inwardly of the outer periphery thereof, and spanning the shoulder 24 formed by the countersunk portion. The outer beadlike projection 22 projects farther out from the surface than the inner beadlike projection 20. Adjacent each corner of the body an integral foot member 26 is provided for supporting the tray structure on a flat supporting surface such as a table.

Midway the ends of the body, the sides thereof are formed with substantially triangular-shaped enlargements 28. An elongated slot 30 is formed centrally of each enlargement and across the adjacent side extending to the outer beadlike projection 22. A latching keeper member 32 is slidably mounted on the enlargement 28 over the slot 30 and slides toward and away from the countersunk portion 18. The latch keeper member 32 includes a rectangular plastic plate 34 with circular stud 36 formed on its undersurface and positioned in the slot 30, the bottom of the stud being flush with the bottom surface of the body of the tray structure 14. One long edge is cut away along its bottom surface to provide a groove 38 and the other long edge is enlarged on its top surface providing an upstanding finger piece 40 for actuating the latching member. A rectangular-shaped thin metal plate 42, smaller in dimensions than the plate 34, is superimposed centrally of one surface of the plastic plate, the top surface as viewed in Figs. 1 and 5. Another thin rectangular-shaped plate 44, narrower but longer than the plate 42 is positioned flatwise against the bottom surface of the stud 36 and against the bottom surface of the plate 16. One end of the lower plate 44 is secured to the stud 36 of the latching member by a pair of rivets 46 extending through the top plate 42, stud 36 and lower plate 44. The other free end of the bottom plate 44 is formed with a pair of transversely disposed outer and inner undulations 48 and 50, respectively.

The cover 14 has a body of box-like formation, substantially square in plan and formed of sheet metal. The body includes, as viewed in Fig. 1, a top wall 52 and side walls 54 and is open at the bottom. The top and one pair of opposed side walls are formed integrally with each other from a single sheet of metal, with the walls merging gracefully with each other and forming rounded shoulders. The other opposed side walls are in the form of sheet metal plates fitted between the top and adjacent side walls. Each of said other side walls has an inwardly extending flange 58 along its top edge underlapping the adjacent side edge of the top wall, and has an inwardly extending flange 60 at each end thereof underlapping the side edges of the adjacent side walls. The material of the side walls along the bottom edges thereof is bent inwardly to form flanges 62. The lapping flanges are fastened to the respective edges of the top and side walls by rivets 64.

On the inturned flanges 62 on one pair of opposed side walls 54, midway the ends thereof, fixed bolts in the form of thin metal plates 66 are welded to the surface of the flanges, one long edge of the plate projecting outwardly of the adjacent side wall. One pair of opposed side walls 54 may be corrugated or ribbed as indicated at 68 to reinforce the walls and enhance the appearance of the cover. An elongated plastic handle 70 is secured to the top surface of the top wall by bolts 72.

In using the improved cake holder and cover, a cake or the like is placed on top of the countersunk portion 18. The cover 14 is placed over the cake with the inwardly extending flanges 62 seated just outwardly of the countersunk portion on the ledge formed thereby as shown in Fig. 4. This ledge provides a solid base for the cover. The cover is positioned so that the projecting bolts 66 face and are in line with the slidable keepers 32. The keepers are then slid by means of the finger pieces 40 inwardly so that the grooved portions 38 thereof overlie and interlock with the bolts and hold the cover on the tray. The cover is readily removed by sliding the keepers outwardly by means of the finger pieces. When the cover is removed, the cake is exposed and the tray 16 can easily be lifted off its supporting surface and function as a serving tray. The undulations 48 and 50 on the plates 44 of the keepers 32 snap over the beaded projections 20 and 22 on the tray 16 and yieldingly hold the keepers in moved position.

In Fig. 9, a keeper 32' with a pair of undulated plates 44' is shown. These plates hold the keepers more securely in moved position.

While I have illustrated and described the preferred embodiments of my invention, it is to be understood that I do not limit myself to the precise constructions herein disclosed and that various changes and modifications may be made within the scope of the invention as defined in the appended claims.

Having thus described my invention, what I claim as new, and desire to secure by United States Letters Patent is:

1. A cake holder and cover comprising a flat glass square-shaped plate adapted to support a cake or the like, laterally extending enlargements on opposed side edges of the plate, said enlargements having slots extending radially of the plate, beadlike projections extending outwardly of the bottom surface of the plate around the sides thereof inwardly of the periphery thereof, keeper members slidably mounted on said enlargements over said slots, an inverted box-like cover removably mounted on the plate, bolts fixed on opposed sides of the cover and projecting outwardly thereof, depending studs on said keeper members slidable in said slots, and elongated metal plates having one end secured to the bottom surface of said studs and projecting inwardly below the bottom surface of the plate, said elongated metal plates having undulations across their outer free ends adapted to engage the beadlike projections on the bottom surface of the plate for yieldingly holding the keeper members in moved position.

2. A cake holder and cover comprising a flat glass square-shaped plate adapted to support a cake or the like, laterally extending enlargements on opposed side edges of the plate, said enlargements having slots extending radially of the plate, beadlike projections extending outwardly of the bottom surface of the plate around the sides thereof inwardly of the periphery thereof, keeper members slidably mounted on said enlargements over said slots, an inverted box-like cover removably mounted on the plate, bolts fixed on opposed sides of the cover and projecting outwardly thereof, depending studs on said keeper members slidable in said slots, and elongated metal plates having one end secured to the bottom surface of said studs and projecting inwardly below the bottom surface of the plate, said elongated metal plates having undulations across their outer free ends adapted to engage the beadlike projections on the bottom surface of the plate for yieldingly holding the keeper members in moved position, and a handle on the top of said cover.

3. A cake holder and cover comprising a flat glass square-shaped plate adapted to support a cake or the like, laterally extending enlargements on opposed side edges of the plate, said enlargements having slots extending radially of the plate, beadlike projections extending outwardly of the bottom surface of the plate around the sides thereof inwardly of the periphery thereof, keeper members slidably mounted on said enlargements over said slots, an inverted box-like cover removably mounted on the plate, bolts fixed on opposed sides of the cover and projecting outwardly thereof, depending studs on said keeper member slidable in said slots and elongated metal plates having one end secured to the bottom surface of said studs, and projecting inwardly below the bottom surface of the plate, said elongated metal plates having bifurcated free ends, said bifurcated free ends having undulations across their outer free ends adapted to engage the beadlike projections of the bottom surface of the plate for yieldingly holding the keeper member in moved position.

References Cited in the file of this patent
UNITED STATES PATENTS

| | | |
|---|---|---|
| 2,457,023 | Zelt | Dec. 21, 1948 |
| 2,843,440 | Billig | July 15, 1958 |